UNITED STATES PATENT OFFICE.

WILLIAM BLACKMORE AND ALFRED HOWARD, OF LONDON, ENGLAND, ASSIGNORS TO THE T. R. REFRACTORY ORE SYNDICATE LIMITED, OF LONDON, ENGLAND.

TREATMENT OF PYRITIC ORES.

No. 839,451.     Specification of Letters Patent.     Patented Dec. 25, 1906.

Application filed March 27, 1906. Serial No. 308,341.

*To all whom it may concern:*

Be it known that we, WILLIAM BLACKMORE and ALFRED HOWARD, subjects of the King of Great Britain and Ireland, residing at London, England, have invented new and useful Improvements in the Treatment of Pyritic Ores Containing Gold, Silver, or other Valuable Metals, of which the following is a specification.

This invention relates to a process of treatment of pyritic ores containing gold, silver, or other valuable metals, and has for its object the removal of the iron pyrites from such ores, enabling the recovery of the valuable metals to be effected in a very simple manner at a low cost and with no risk of losing any of the valuable contents of such ores, as has been the case in the past.

To carry the invention into effect, the ore is pulverized to about a thirty mesh and is then oxidized in a furnace at a temperature of about 800° Fahrenheit by passing steam and air in regulated quantities through the furnace, so as to come into contact with the heated ore contained in the said furnace, the amount passed through the furnace being regulated according to the amount of iron pyrites in the ore under treatment. The steam is added to modify the oxidizing action of the air and in such proportion as to prevent excessive local reaction. The effect of this treatment is to convert the iron pyrites into either a normal or basic sulfate or a mixture of sulfate with oxid of iron, and the operation is regulated with a view to the production of a maximum proportion of sulfate with the least possible admixture of oxid. The reaction is carried on in the furnace until the iron pyrites is sufficiently oxidized—that is to say, oxidized to the point at which the maximum production of sulfate which can be economically obtained from the given ore is reached—this fact being ascertained by suitable tests in the usual way. After the reaction is completed it is found that the iron compounds are only slightly soluble in water, and to remove them by solution in water cannot be satisfactorily carried out commercially. We therefore leach the roasted ore with water to which has been added sulfuric or other acid liquors to cause the iron to pass into solution in a reasonable time. We have found practical results can be achieved by a solution containing five per cent. of sulfuric acid; but it must be clearly understood that satisfactory results can be obtained by using an increased quantity of weaker solution. Under the above treatment we find that the copper, cobalt, and nickel, if any of these are present in the ore, are dissolved by the acid solution in addition to the iron and can be separated and recovered by ordinary precipitants for these metals, leaving the iron unaffected in the solution. After separation from the liquor the solid residue containing the gold, silver, or other valuable metal can be treated by suitable extraction processes. For example, in a gold and silver ore the residues can be treated for the recovery of gold and silver by the ordinary cyanid or chlorination or other known methods. In the case of ores containing lead or zinc the residues are further treated for the recovery of these metals by ordinary lead or zinc smelting processes.

The acid liquors necessary for the above solution can be produced as a by-product of the process by passing the sulfurous gases evolved during the roasting treatment through suitable condensing-towers or directly absorbing them by water with or without a further addition of air or other oxidizing agents, and we find that this part of the process is an important step to the economical elimination of the iron from the ores.

Having now particularly described and ascertained the nature of our said invention and in what manner the same is to be performed, we declare that what we claim is—

1. A process for the treatment of pyritic ores for the recovery of valuable metals contained therein, consisting of the roasting of the pulverized ore at a temperature of about 800° Fahrenheit in the presence of an oxidizing agent consisting of air and steam so as to convert the sulfid of iron into normal or basic sulfate of the leaching of the ore in acid liquors to dissolve the iron sulfate, and of the separation of the solution from the solid residue containing the valuable metals, substantially as described.

2. In a process for the treatment of pyritic ores for the recovery of valuable metals contained therein consisting of the roasting of the pulverized ore at a temperature of about 800° Fahrenheit in the presence of an oxidizing agent consisting of air and steam so as to convert the sulfid of iron into normal or basic sulfate of the leaching of the ore in acid liquors to dissolve the iron sulfate and of the separation of the solution from the solid residue containing the valuable metals, the collection of the sulfurous gases evolved by the roasting treatment and their absorption by water to be used as the acid liquors in the process of solution of the iron sulfate, substantially as described.

3. A process for the treatment of pyritic ores containing gold, silver and other metals such as iron, cobalt, copper, or nickel consisting of the roasting of the pulverized ore at a temperature of about 800° Fahrenheit in the presence of an oxidizing agent consisting of air and steam so as to convert the iron, copper, cobalt or nickel into sulfates the leaching of those sulfates in liquors containing sulfuric acid, and the treatment of the said liquors by precipitants to recover the metals therefrom, and the after treatment of the residues containing gold and silver by known processes, substantially as described.

In testimony whereof we have signed our names to this specification in the presence of two subscribing witnesses.

WILLIAM BLACKMORE.
ALFRED HOWARD.

Witnesses:
RICHARD A. HOFFMANN,
ALBERT T. ROPER.